United States Patent Office 2,768,967
Patented Oct. 30, 1956

2,768,967

PROCESS FOR MANUFACTURE OF 2,5 DIKETO-8-NONEN-3-OL

Abraham Bavley, Brooklyn, and Eric C. Schreiber, Levittown, N. Y., assignors to Chas. Pfizer & Co., Inc., New York, N. Y., a corporation of Delaware No Drawing. Application April 22, 1954,
Serial No. 425,050

12 Claims. (Cl. 260—483)

This invention is concerned with a new process for the manufacture of nona-8-ene-2,5-dione-3-ol, highly useful in the manufacture of insecticides of the allethrin type. In particular it is concerned with the manufacture of this diketone from an ester of acetone dicarboxylic acid.

Allethrin is a highly valuable insecticide material which may be manufactured from the cyclic ketone known as allethrolone (2-allyl-4-hydroxy-3-methyl-2-cyclopentane-1-one). This compound has previously been made in moderate yield from acetoacetic ester by a multi-step process. It has now been found that an ester of acetone dicarboxylic acid may be used as the starting material for the synthesis of allethrolone, and that this new process and the intermediates formed in the process have certain distinct advantages over the previously known method and intermediates.

The process may be outlined as follows:

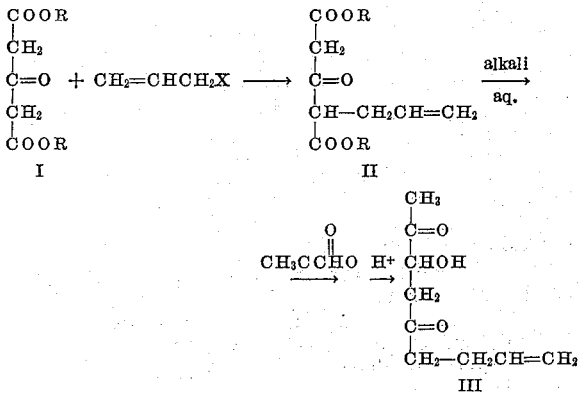

FIGURE I wherein R is a lower alkyl group, i. e. having up to about 5 carbons in its principal chain, X is halogen, preferably bromine or chlorine.

Acetone dicarboxylic acid is readily prepared from the cheap and highly available citric acid by treatment with sulfuric acid. Esters of acetone dicarboxylic acid may be prepared from the acid by the usual esterification procedures. For the present novel process, lower aliphatic esters such as the methyl, ethyl or propyl esters are particularly useful. By condensation of an ester of acetone dicarboxylic acid with an allyl halide, preferably the bromide or the chloride, in the presence of an alkaline condensing agent, there is formed a mono-allyl acetone dicarboxylic acid ester.

This process step is preferably conducted under anhydrous conditions in a suitable solvent such as one of the lower aliphatic alcohol, e. g. methanol, ethanol, propanol, or in an ether such as diethyl ether, and in the presence of an anhydrous alkaline condensing agent, such as an alkali metal alcoholate, e. g. sodium methoxide, sodium ethoxide or potassium propoxide. In general, approximately molar proportions of the ester, allyl halide and alkaline condensing agents are used. It may be preferred, under some conditions, to use a slight excess of the ester in order to asure the formation of a high proportion of the mono-allyl compound. However, it has been noted that allyl chloride reacts appreciably slower than does allyl bromide, since there is a tendency to form cyclic dehydration products from acetone dicarboxylic acid in the presence of alkaline condensing agents when the reaction is prolonged. It has been found useful to use a somewhat greater proportion of allyl chloride than of the bromide in conducting the new reaction, for instance, the use of three moles of allyl chloride for each mole of acetone dicarboxylic acid ester has been found to be quite effective. Generally it is necessary to heat the reaction mixture for one or more hours. Maximum yields are often obtained by heating for as many as 24 hours. The reaction may be accelerated to a certain extent by operating the process step under pressure, that is, by conducting the reaction in a sealed glass tube or in a metallic bomb at a temperature higher than the boiling point of the solvent used. The product may be recovered by removing any salt that has separated from the reaction mixture and concentrating the solution before fractionally distilling the residual material. The allyl dialkyl acetone dicarboxylate thus obtained is a light colored or colorless liquid. This material is obtained in yields ranging from 50 to 90 percent of the theoretical yield depending upon the care used in conducting the reaction, the purity of the starting materials, etc. Various inert organic solvents may be used as a medium for the reaction. The most useful are lower aliphatic alcohols, such as methanol or ethanol.

A mono-allyl dialkyl acetone dicarboxylate, when treated with an alkaline aqueous solution for several hours with subsequent adjustment of the pH to a value from slightly acidic to somewhat alkaline and condensation with pyruvaldehyde results in the formation of an intermediate which, upon strong acidification in aqueous solution, results in the formation of nona-8-ene-2,5-dione-3-ol, which may then be isolated. Thus, a series of distinct steps may be combined to form the valuable allethrin intermediate without the isolation of any of the intervening compounds. If it is desired, these materials may be isolated in purified form. However, there is no advantage to such isolation and, in fact, there is a very great and unexpected advantage in being able to carry out the combination of this series of reactions without isolation of the intermediate products. The series of reactions that may be carried out in this manner without isolation of intermediates may be represented by the following series of steps:

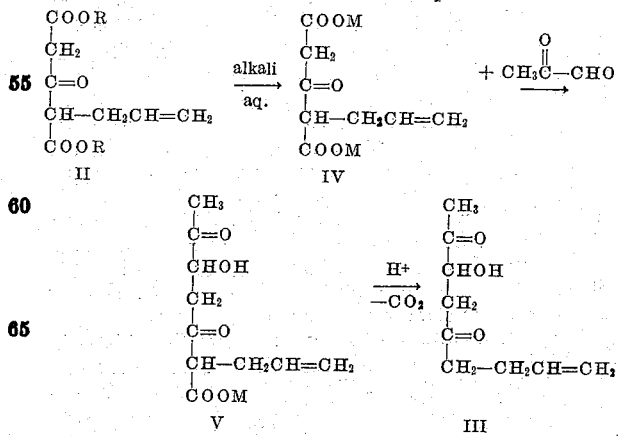

The starting material (II) is the mono-allyl dialkyl acetone dicarboxylate whose preparation is shown in Figure I above and the product (III) is that shown in Figure I.

The valuable diketo alcohol product is used as an intermediate for allethrin in large-scale manufacturing processes. The present process possesses many advantages over the known methods of manufacture, such as that described by Schechter et al., in the Journal of the American Chemical Society, volume 71, p. 3165–3173 (1949). Overall yields obtained by the Schechter process of the corresponding intermediate prepared by the present process are in the order of about 19 percent whereas the present process affords yields of 22 percent or higher with a greatly simplified process involving the isolation of fewer intermediates and not involving the decarboxylation and recarboxylation reactions which are part of the Schechter process.

In conducting this second step of the present process, that is the conversion of compound II to compound III, the mono-allyl dialkyl acetone dicarboxylate is contacted in solution or suspension with an aqueous solution containing at least two molecular proportions of an alkaline agent, preferably an alkali metal or alkaline earth metal hydroxide or carbonate per molecular proportion of the ester. This saponification reaction generally takes place with relative ease at room temperature and, in fact, it is not advisable to utilize temperatures appreciably over about 35° C. The reaction may be conducted at temperatures of 10° C. or lower. Reagents such as sodium hydroxide, potassium hydroxide, lithium hydroxide, sodium carbonate, barium hydroxide, and lithium carbonate may be used for conducting this step. Saponification results in the formation in the reaction mixture of a metal salt of mono-allyl acetone dicarboxylic acid (IV).

This compound may be isolated in the form of a solid material, for instance, by addition of a non-solvent for the compound to the aqueous solution, e. g. by the addition of a lower aliphatic alcohol in sufficient quantity. Alternatively, the solution may be acidified and mono-allyl acetone dicarboxylic acid may be isolated, e. g. by extraction with a water-immiscible solvent such as ether. However, there is no advantage to the isolation of these materials and, in fact, they are rather unstable compounds and subjection to conditions often used for isolation of organic compounds may result in some decomposition. Both the metallic salts and the mono-allyl acetone dicarboxylic acid are white or light colored solid materials.

Aqueous solutions of metallic salts of mono-allyl acetone dicarboxylic acid prepared as described above are treated with pyruvaldehyde, preferably at a pH of from about 6.5 to about 9.5 to obtain the diketo hydroxy acid salt indicated by Formula V above. Higher pH's than 9.5 may be used, although there is no specific advantage to such a practice. pH's in the range of from about 7.5 to about 8.5 are especially useful. The use of a salt of mono-allyl acetone dicarboxylic acid having appreciable water solubility is favored. The alkali metal salts and alkaline earth metal salts are, in general, sufficiently soluble for this purpose. The metallic salt of 1-allyl-2,5-diketo-4-hydroxyheptanoic acid, which is formed by the reaction, preferably conducted with the use of approximately one molecular proportion of pyruvaldehyde per molecular proportion of the dicarboxylic acid starting material, may be isolated from aqueous solution by precipitation with a non-solvent, e. g. by the addition of a large volume of methanol or other suitable solvent, or, for instance, by drying the aqueous solution from the frozen state under vacuum.

However, there is no advantage to isolating this solid metallic salt from solution, since acidification of the aqueous solution of the metallic salt results in the formation, by release of carbon dioxide, of nona-8-ene-2,5-dione-3-ol (III). This may be accomplished merely by adjusting the aqueous solution of the metallic salt of 1-allyl-2,5-diketo-4-hydroxyheptanoic acid to a strongly acidic pH, preferably in the range of from about 1.0 to about 2.5. This may be accomplished by the addition of a mineral acid, such as hydrochloric acid, hydrobromic acid, phosphoric acid, sulfuric acid and so forth. The desired diketone may then be isolated from the reaction mixture by such methods as extraction with a water-immiscible solvent, for example, ether, benzene, toluene, etc. The accomplishment of this extraction step may be facilitated by adding to the aqueous solution a neutral water-soluble salt, such as sodium chloride, sodium sulfate, magnesium sulfate, sodium bromide, potassium chloride, and so forth, which relates the distribution coefficient of the diketone into the solvent.

It is difficult to isolate the free acid form of 1-allyl-2,5-diketo-4-hydroxyheptanoic acid, since acidification of the solution of the salt thereof even at room temperature readily brings about decarboxylation to the desired allethrin intermediate. However, by isolation of a metallic salt of the acid and careful treatment at a low temperature with acid, it is possible to form some of the free acid. This, however, readily decarboxylates even at room temperature.

It is known that in the presence of dilute alkali this diketone cyclizes to form the valuable insecticide intermediate allethrolone. Thus, this invention provides a new process of preparing the valuable intermediate allethrolone through a series of novel steps which are:

(a) Condensation of an acetone dicarboxylic acid ester with an allyl halide to form a mono-allyl acetone dicarboxylic acid ester.

(b) Saponification of the ester thus formed.

(c) Condensation of mono-allyl acetone dicarboxylic acid (preferably as a solution of its salt) with pyruvaldehyde.

(d) Decarboxylation of the diketo acid thus formed to obtain a known intermediate for allethrolone.

In the course of the present process a group of novel and useful compounds are formed. These are:

(a) Mono-allyl acetone dicarboxylic acid, its salts and esters.

(b) 1-allyl-2,5-diketo-4-hydroxyheptanoic acid and its salts.

The principal advantages of the present process are the ready availability of the starting material, the limited number of steps required and the good overall yield of the desired end product. Most important is that many of the intermediates need not be isolated as is the case with prior art methods.

The following examples are given by way of illustration only and are not to be considered as a limitation on the scope of this invention, which is to be limited only by the specific wording of the appended claims.

*Example I*

Sodium weighing 23 grams (1.0 mole) was dissolved in 5 liters of dry methanol. When the metal was completely dissolved, 174 grams (1.0 mole) of the dimethyl ester of acetone dicarboxylic acid were slowly added to the reaction mixture. The mixture was then stirred for three hours at room temperature. A solution of 120 grams (1.0 mole) of allyl bromide in 800 milliliters of methanol was added to the mixture over a period of one and one-half hours. The mixture was stirred vigorously during the addition and the resultant mixture was then refluxed for eighteen hours. The solvent was then distilled from the reaction mixture and the oily residue was diluted with chloroform. Sodium bromide weighing 103 grams (100% of theoretical quantity) was filtered from the solution. The chloroform was distilled from the organic solution and 203 grams of an orange oil were obtained. The oil was distilled under vacuum and there were obtained 173 grams of a colorless oil boiling at 93°–98° C. under 0.5–0.75 mm. of mercury pressure. The refractive index of the product was $n_D^{25}=1.4553$.

This represents an 82% yield of highly purified mono-allyl dimethyl acetone dicarboxylate.

Mono-allyl dimethyl acetone dicarboxylate weighing 10.7 grams (0.05 mole) was added to a solution of 8.5 grams of potassium hydroxide (89% pure) in 45 milliliters of water. The mixture was maintained at 5° C. and was stirred overnight. When all of the oil had dissolved, the reaction mixture was neutralized with 20% sulfuric acid and 55 grams of an aqueous solution of 33% by weight pyruvaldehyde. The pH of the mixture was adjusted to between 7.5 and 8.0. It was then stirred at room temperature for three days.

The aqueous solution of the condensation product (1-allyl-2,5-diketo-4-hydroxyheptanoic acid sodium salt) of pyruvaldehyde and allyl acetone dicarboxylic acid ester so prepared was adjusted to pH 2.0 by the addition of concentrated hydrochloric acid. During the course of the addition of the acid, gas, apparently carbon dioxide, was evolved. The aqueous solution was saturated with sodium chloride and was then extracted several times with equal volumes of ether. The ether solution was dried over anhydrous magnesium sulfate and the solvent was removed yielding 8.0 grams of a red oil. The oil was distilled under vacuum and 1.1 grams of allyl dimethyl acetone dicarboxylate was recovered. The second fraction, weighing 2.2 grams and boiling at 98° C. under 2 mm. of mercury pressure, had a refractive index of $n_D^{25} = 1.466$. This represents a 32% yield of nona-8-ene-2,5-dione-3-ol. The physical properties of the product conform to those reported in the scientific literature. The product was also analyzed to confirm its identity.

*Example II*

2.3 grams of sodium metal (0.1 mole) was dissolved in 200 milliliters of anhydrous methanol. The mixture was cooled to room temperature and 17.4 grams (0.10 mole) of dimethyl acetone dicarboxylic acid was added. The mixture was stirred in a flask protected from atmospheric moisture and carbon dioxide and 23.1 grams (0.3 mole) of allyl chloride was gradually added to the mixture over one-half hour. The resulting mixture was stirred and refluxed for eighteen hours. It was then cooled. The precipitated sodium chloride was filtered and the solution was concentrated under vacuum at room temperature. Further sodium chloride was filtered from the liquid. The total weight of sodium chloride was 5.8 grams. The yellow liquid residue was then fractionally distilled. 11.0 grams of dimethyl mono-allyl acetone dicarboxylate was obtained.

What is claimed is:

1. In the synthesis of allethrin, the steps which comprise contacting an acetone dicarboxylic acid ester with an allyl halide in the presence of an alkaline condensing agent to form an allyl acetone dicarboxylic acid ester, saponifying the said ester and condensing the saponification product with pyruvaldehyde at a pH of at least about 6.5, and then acidifying the 1-allyl-2,5-diketo-4-hydroxyheptanoic acid salt thus formed.

2. A process for the preparation of nona-8-ene-2,5-dione-3-ol, which comprises contacting an acetone dicarboxylic acid ester with an allyl halide in the presence of an alkaline condensing agent to form an allyl acetone dicarboxylic acid ester, saponifying said ester and condensing the so-formed allyl acetone dicarboxylic acid with pyruvaldehyde in the presence of water at an alkaline pH, and acidifying the solution of the so-produced 1-allyl-2,5-diketo-4-hydroxyheptanoic acid.

3. A process as claimed in claim 2 wherein an ester of acetone dicarboxylic acid with an alcohol having not more than 5 carbon atoms is condensed in the presence of an alkali metal condensing agent in a lower aliphatic alcohol with a compound chosen from the group consisting of allyl bromide and allyl chloride, the so-produced allyl acetone dicarboxylic acid is isolated and saponified with a compound chosen from the group consisting of alkali metal hydroxide and carbonates in water, pyruvaldehyde is then added to the aqueous hydrolysate and the pH is adjusted to between 7.5 and 8.5 and the so-produced aqueous solution is acidified.

4. A process for the preparation of an allyl acetone dicarboxylic acid ester, which comprises contacting an acetone dicarboxylic acid ester with an allyl halide in the presence of an alkaline condensing agent in an anhydrous solvent.

5. A process for the preparation of 1-allyl-2,5-diketo-4-hydroxy-heptanoic acid, which comprises contacting an aqueous solution of an allyl lower alkyl acetone dicarboxylate at a slightly basic pH with pyruvaldehyde.

6. A process for the preparation of nona-8-ene-2,5-dione-3-ol, which comprises acidifying a basic aqueous solution of 1-allyl-2,5-diketo-4-hydroxyheptanoic acid.

7. A compound chosen from the group consisting of mono-allyl acetone dicarboxylic acid, its metal salts and its esters.

8. An ester of mono-allyl acetone dicarboxylic acid and an alcohol having up to 5 carbon atoms.

9. A salt of mono-allyl acetone dicarboxylic acid with a metal chosen from the group consisting of alkali metals and alkaline earth metals.

10. A compound chosen from the group consisting of 1-allyl-2,5-diketo-4-hydroxyheptanoic acid and the metal salts thereof.

11. An alkali metal salt of 1-allyl-2,5-diketo-4-hydroxyheptanoic acid.

12. An alkaline earth metal salt of 1-allyl-2,5-diketo-4-hydroxyheptanoic acid.

References Cited in the file of this patent

UNITED STATES PATENTS

| | | |
|---|---|---|
| 2,358,768 | Wallingford et al. | Sept. 19, 1944 |
| 2,574,500 | Schechter et al. | Nov. 13, 1951 |
| 2,603,652 | Schechter et al. | July 15, 1952 |

FOREIGN PATENTS

| | | |
|---|---|---|
| 88,633 | Austria | May 26, 1922 |

OTHER REFERENCES

Organic Chemistry (Fieser et al.), publ. by Rheingold (N. Y.) 1950 (2nd. Ed.), page 309.

Reid et al.: J. Am. Chem. Soc. 73 (1951), pp. 4995–6.